(12) United States Patent
Fay et al.

(10) Patent No.: US 10,068,100 B2
(45) Date of Patent: Sep. 4, 2018

(54) PAINTING CONTENT CLASSIFICATIONS ONTO DOCUMENT PORTIONS

(71) Applicant: Microsoft Technology Licensing, LLC, Redmond, WA (US)

(72) Inventors: Jonathan Edgar Fay, Woodinville, WA (US); Robert Earl Standefer, III, Duvall, WA (US); Christopher Lee Mullins, Sammamish, WA (US); Joshua Allen Cowhig, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 82 days.

(21) Appl. No.: 15/002,277

(22) Filed: Jan. 20, 2016

(65) Prior Publication Data

US 2017/0206366 A1     Jul. 20, 2017

(51) Int. Cl.
| | |
|---|---|
| *G06F 7/04* | (2006.01) |
| *G06F 21/60* | (2013.01) |
| *G06F 17/21* | (2006.01) |
| *G06F 21/62* | (2013.01) |
| *G06F 17/24* | (2006.01) |
| *G06F 3/0481* | (2013.01) |

(52) U.S. Cl.
CPC .......... *G06F 21/604* (2013.01); *G06F 3/0481* (2013.01); *G06F 17/212* (2013.01); *G06F 17/241* (2013.01); *G06F 21/6209* (2013.01); *G06F 21/6218* (2013.01); *G06F 21/6227* (2013.01); *G06F 2203/04804* (2013.01)

(58) Field of Classification Search
CPC .. G06F 21/604; G06F 21/6218; G06F 17/212; G06F 17/241; G06F 3/0481; G06F 21/6209; G06F 21/6227; G06F 2203/04804
See application file for complete search history.

(56) References Cited

U.S. PATENT DOCUMENTS

| | | | |
|---|---|---|---|
| 6,516,315 B1 | 2/2003 | Gupta | |
| 6,578,037 B1 | 6/2003 | Wong et al. | |
| 7,290,285 B2 | 10/2007 | McCurdy et al. | |
| 7,515,717 B2 | 4/2009 | Doyle et al. | |
| 7,660,902 B2 | 2/2010 | Graham et al. | |

(Continued)

FOREIGN PATENT DOCUMENTS

EP     1225500 A2     7/2002

OTHER PUBLICATIONS

Robert W. Schilpp, "Guide to Marking Documents," Oct. 4, 2001, pp. 1-73.*

(Continued)

*Primary Examiner* — Luu Pham
*Assistant Examiner* — Canh Le
(74) *Attorney, Agent, or Firm* — Michael Best & Friedrich LLP

(57) ABSTRACT

A facility for interacting with an electronic document is described. The facility causes to be displayed a visual representation of the document, and receives input representing a painting interaction with a portion of the displayed visual representation of the document that corresponds to a portion of the document. In response to receiving the first input, the facility imposes on the corresponding portion of the document a distinguished content classification level.

16 Claims, 10 Drawing Sheets

(56) References Cited

U.S. PATENT DOCUMENTS

| | | | |
|---|---|---|---|
| 7,882,565 B2 | 2/2011 | Collins et al. | |
| 7,930,757 B2 | 4/2011 | Shapiro et al. | |
| 7,958,147 B1 | 6/2011 | Turner et al. | |
| 8,639,721 B2 | 1/2014 | Whitten et al. | |
| 8,713,054 B2* | 4/2014 | Turner | G06F 21/604 |
| | | | 707/694 |
| 8,751,424 B1* | 6/2014 | Wojcik | G06F 21/554 |
| | | | 706/20 |
| 8,832,150 B2 | 9/2014 | O'Sullivan et al. | |
| 2006/0085469 A1 | 4/2006 | Pfeiffer et al. | |
| 2006/0092295 A1* | 5/2006 | Mercer | G11B 27/031 |
| | | | 348/239 |
| 2006/0206531 A1* | 9/2006 | Komamura | G06F 17/30011 |
| 2008/0104118 A1* | 5/2008 | Pulfer | G06F 17/30722 |
| 2009/0025063 A1 | 1/2009 | Thomas | |
| 2009/0060343 A1 | 3/2009 | Rosca | |
| 2009/0164878 A1 | 6/2009 | Cottrille | |
| 2010/0186091 A1* | 7/2010 | Turner | G06F 17/241 |
| | | | 726/26 |
| 2010/0229246 A1* | 9/2010 | Warrington | G06F 21/6218 |
| | | | 726/28 |
| 2012/0023075 A1 | 1/2012 | Pulfer et al. | |
| 2014/0053232 A1* | 2/2014 | Coles | G06F 21/6209 |
| | | | 726/1 |
| 2016/0147912 A1* | 5/2016 | Bergin | G06F 3/0481 |
| | | | 703/1 |

OTHER PUBLICATIONS

Sandeep Dixit, "Electronic document classfication using support vector machine—an application for e-learning," 2005, pp. 191-198.*

Bertino, et al., "Controlled access and dissemination of XML documents," In Proceedings of the 2nd international workshop on Web information and data management, Nov. 5, 1999, pp. 22-27.

"International Search Report and Written Opinion Issued in PCT Application No. PCT/US2017/013582", dated May 29, 2017, 11 Pages.

* cited by examiner

| document id | portion | classification level |
|---|---|---|
| 01236495 | ¶ 3 | private |
| 01236495 | ¶ 4 | confidential |
| ⋮ | ⋮ | | content classification table — 500
— 501
— 502
511  512  513

*FIG. 5*

PAINTING CONTENT CLASSIFICATIONS ONTO DOCUMENT PORTIONS

BACKGROUND

It is common to classify the sensitivity of contents of electronic documents in ways that classify all of the contents of each document together; i.e., for a particular document, these techniques generate a single sensitivity classification that applies to the entire document.

For example, in some cases the sensitivity of contents of electronic documents is classified by storing documents in different places based on their overall level of sensitivity. As one example, documents of a particular company containing any confidential content may be stored on a first storage device or server that may be accessed only by specifically authorized individuals; documents containing no confidential content but some private content may be stored may be stored on a separate second storage device or server accessible by any employee of the company; and documents containing no confidential content and no private content may be stored on a third storage device or server that may be accessed by anyone.

SUMMARY

This summary is provided to introduce a selection of concepts in a simplified form that are further described below in the Detailed Description. This summary is not intended to identify key factors or essential features of the claimed subject matter, nor is it intended to be used to limit the scope of the claimed subject matter.

A facility for interacting with an electronic document is described. The facility causes to be displayed a visual representation of the document, and receives input representing a painting interaction—similar to painting interactions sometimes used to paint formats in word processing documents—with a portion of the displayed visual representation of the document that corresponds to a portion of the document. In response to receiving the first input, the facility imposes on the corresponding portion of the document a distinguished content classification level.

BRIEF DESCRIPTION OF THE DRAWINGS

FIG. 5 is a table diagram showing sample contents of a content classification table used by the facility in some embodiments to store content classifications that have been imposed on document portions.

DETAILED DESCRIPTION

Figure 1:
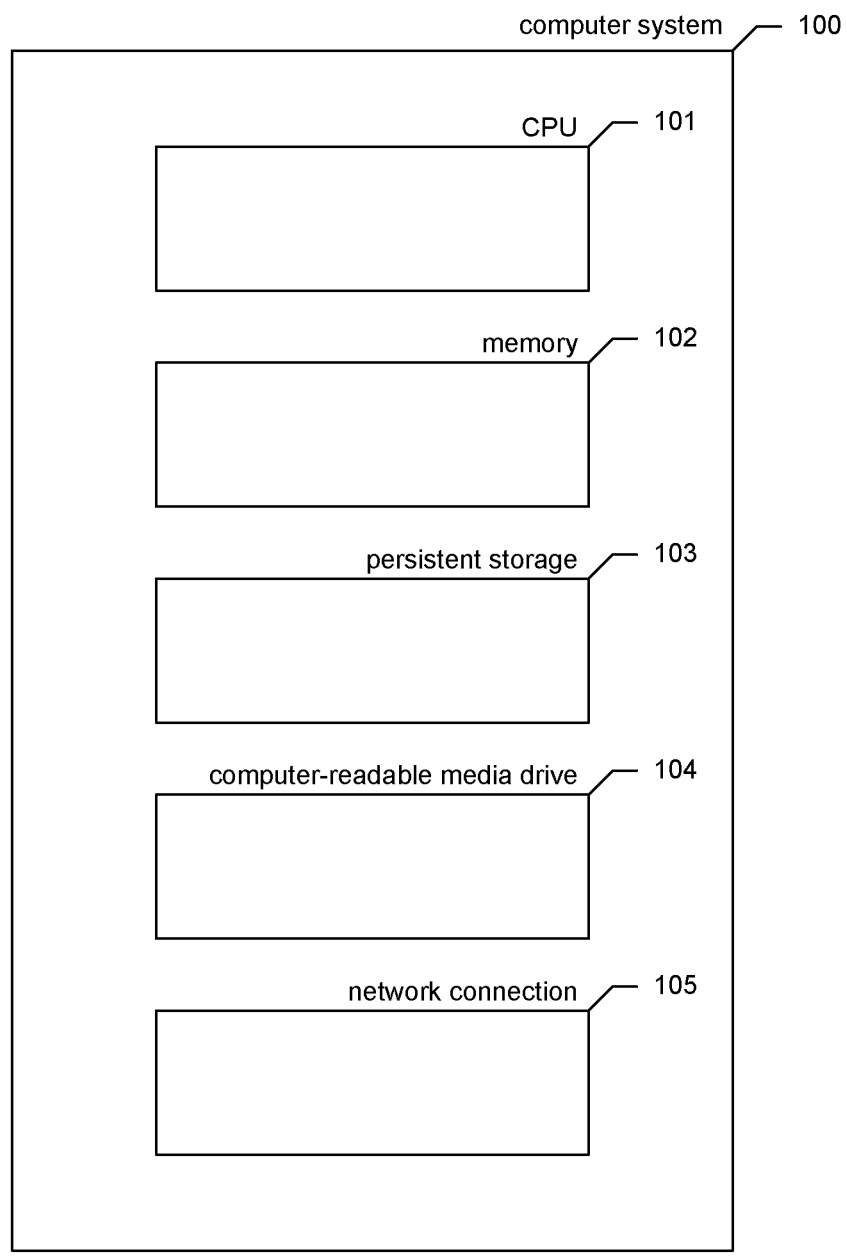
FIG. 1 is a block diagram showing some of the components typically incorporated in at least some of the computer systems and other devices on which the facility operates.

The inventors have recognized a significant deficiency of conventional techniques for classifying the sensitivity of contents of electronic documents: they provide no basis for classifying different portions of the same document at different levels of sensitivity.

Accordingly, the inventors have conceived and reduced to practice a software and/or hardware facility for classifying portions of electronic documents in response to painting interactions by a user ("the facility"). In some embodiments, while a document is displayed, the facility enables a user authorized to classify portions of the document—such as an owner of the document—to select a sensitivity classification level from a displayed palette, then interact with portions of the document in order to classify or reclassify those portions at the selected classification level. In various embodiments, such interactions can take the form of various combinations of dragging the mouse cursor over these portions, clicking on these portions; using the user's finger to tap, slide over, scribble over, or circle these portions; using a stylus to tap, slide over, scribble over, or circle these portions; etc. In various embodiments, the facility imposes content classifications on portions of documents of a variety of types, including portions of documents containing text, images, video, audio, diagrams, spreadsheets, slideshows, messaging and/or commenting content, etc.

In some embodiments, the facility permits a user to paint classification levels onto a representation of the document containing the document's full contents and mirroring the document's formatting. In various other embodiments, the facility permits the user to paint classification levels onto a document representation that relates to the document in a variety of other ways, including: a copy of the document containing the document's full contents but being formatted differently from the document, such as to accommodate visual indications of content classifications imposed on portions of the document by the facility; an outline of the document; a summary of the document; a skeleton of the document; etc.

In various embodiments, the facility displays various kinds of visual indications of content classifications imposed on different portions of the document such as by representing different content classification levels with different colors, patterns, shapes, etc. In various embodiments, the facility adds such visual indications of content classifications in various positions, including, for example, in the document representation's margin; in a scrollbar for scrolling the document representation; in a pop-up window triggered by user interactions such as hovering a mouse cursor or directing a human gaze; within the content of the document representation; etc. In various embodiments, these indications take various forms, including, for example, painting segments of the height of the scrollbar with different colors or patterns relating to content classifications imposed on document portions at corresponding positions within the representation; directly painting the content of the document representation with different colors or patterns, either changing the color of the content (e.g., text) itself, or changing the color or pattern of the background against which the content is displayed, or inserting a border of a particular color and/or pattern around the content; adding to the margin shapes whose presence, colors, patterns, dimensions, or areas relate to the content beside them; etc.

In various embodiments, the facility imposes classification levels on document portions at various different levels of granularity, such that, in painting, the user can select, for example: one or more characters; one or more words; one or more lines; one or more paragraphs; one or more document sections; one or more separately-stored document fragments; one or more arbitrary document spans; or one or more document elements of another type. In some embodiments, the facility automatically shifts between different granularities based upon factors such as the size of the document, the area in which the document representation is being displayed, the zoom level at which the document representation is being displayed, the scroll position of the document representation's display, etc.

In some embodiments, the facility stores the content classifications it imposes in a way that makes them usable by a separate access policy management system in order to regulate access to the corresponding content, and/or itself performs this function. For example, when a particular user opens a document, the facility or the access policy management system determines based upon (1) the user's identity and/or other information about the user, (2) the classification level imposed on each document portion, and (3) access policy rules that specify how each document portion should be displayed to the user. In some embodiments, this results in a proper subset of the document being displayed to the user. In a variety of embodiments, the classifications imposed by the facility on document portions are used to control a variety of types of access to the document portions, including access to display, access to quote or incorporate into another document, access to revise, access to attach comments, etc.

In some embodiments, the facility is easily adapted to the access policy rules and access policy management systems used by a particular organization. For example, the access policy rules for different organizations may employ different logic to determine whether a particular user can display a document portion having the same classification level.

In some embodiments, the facility is easily adapted to the sensitivity classification scheme used by a particular organization, and/or for a particular purpose. For example, for first organization, the facility may be configured to perform sensitivity classification using the levels "high business impact," "moderate business impact," and "low business impact;" while for a second organization the facility may be configured to perform sensitivity classification using the levels "confidential," "private," and "public."

In some embodiments, the facility uses a classification scheme whose classification levels are directly prescriptive of which users may access document portions classified at a particular level. In some such embodiments, the classification levels of the classification scheme correspond to different explicitly-defined groups of users, such as "all Acme Products, Inc. users," "Acme Products, Inc. Marketing Department," "my boss," etc.; or, for personal documents, "extended family," "college friends," "Mayberry Photography Club," etc.

In various embodiments, the facility generates and presents a variety of analytic measures relating to the classification of portions of documents. Examples include: the number of documents that a user viewed on a particular day containing portions classified at a high-business-impact classification level; the number of documents that, during a particular period of time, have their first portion classified at a top-secret classification level; a person making the greatest authoring contributions to documents having portions classified at a top-secret classification level; among document fragments classified at a high-business-impact classification level, those that have been incorporated into the largest number of documents; etc.

By performing in some or all of the ways described above, the facility provides a helpful and easy-to-use tool for imposing content classifications on portions of electronic documents, as a basis, for example, for controlling one or more kinds of access to document portions by different users. In some embodiments, the facility further provides a reduction in the level of computing resources needed to perform content classification of documents, such as by removing the need to acquire and operate separate hardware resources for storing documents whose content is classified at different content classification levels.

FIG. 1 is a block diagram showing some of the components typically incorporated in at least some of the computer systems and other devices on which the facility operates. In various embodiments, these computer systems and other devices 100 can include server computer systems, desktop computer systems, laptop computer systems, netbooks, mobile phones, personal digital assistants, televisions, cameras, automobile computers, electronic media players, etc. In various embodiments, the computer systems and devices include zero or more of each of the following: a central processing unit ("CPU") 101 for executing computer programs; a computer memory 102 for storing programs and data while they are being used, including the facility and associated data, an operating system including a kernel, and device drivers; a persistent storage device 103, such as a hard drive or flash drive for persistently storing programs and data; a computer-readable media drive 104, such as a floppy, CD-ROM, or DVD drive, for reading programs and data stored on a computer-readable medium; and a network connection 105 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Figure 2:
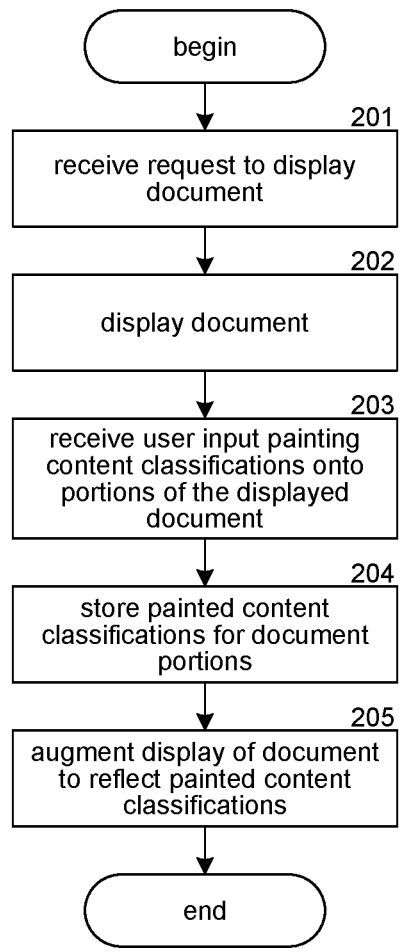
FIG. 2 is a flow diagram showing a process performed by the facility in some embodiments to impose content classifications on portions of a document.
Figure 3:
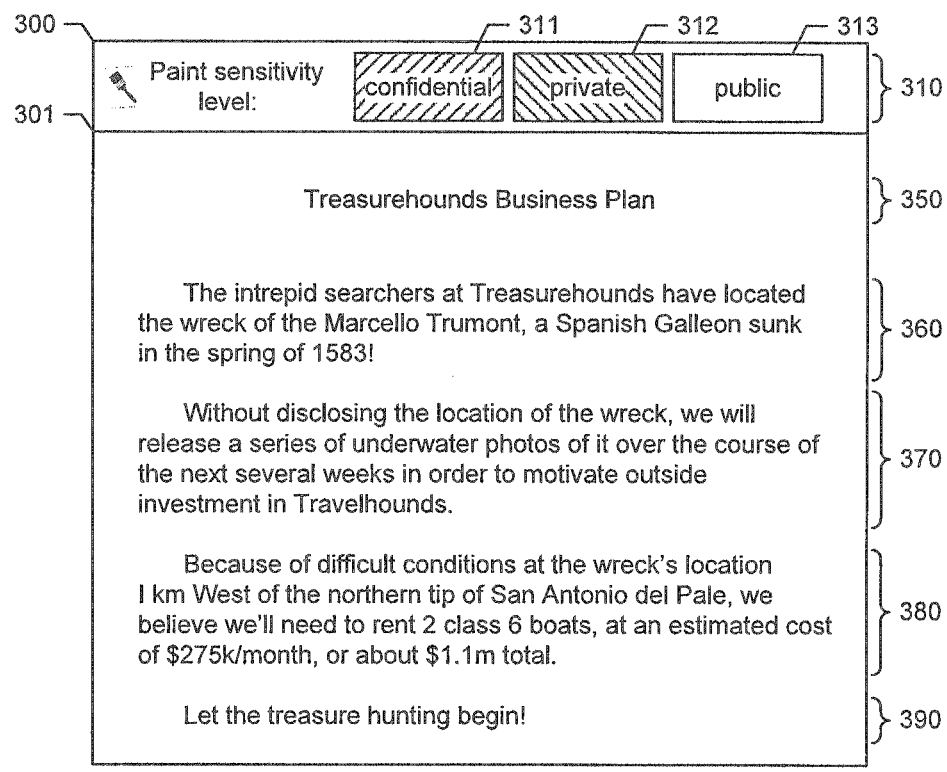
FIG. 3 is a display diagram showing a sample display presented by the facility in some embodiments to present a document for content classification painting.
Figure 4:
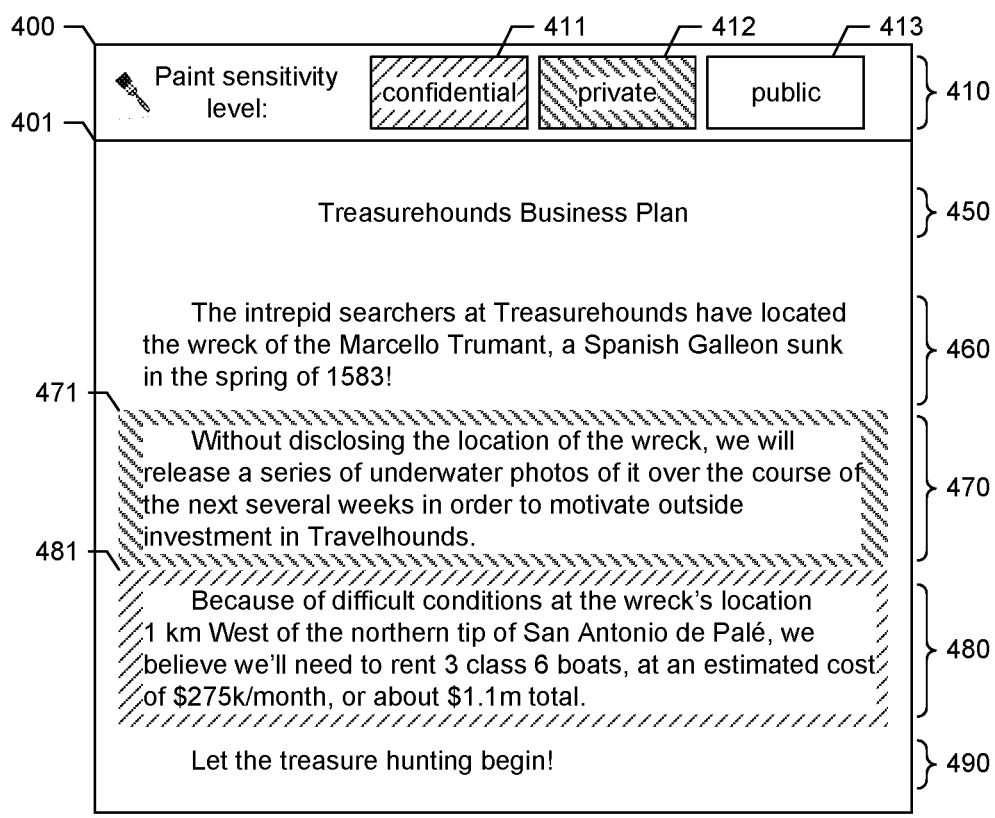
FIG. 4 is a display diagram showing a sample display presented by the facility in some embodiments when the user uses the content classification palette to paint content classifications onto portions of a displayed document.

FIG. 2 is a flow diagram showing a process performed by the facility in some embodiments to impose content classifications on portions of a document. In act 201, the facility receives a request to display a document to a user. In act 202, the facility displays or causes to be displayed a visual representation of this document. An example of the facility's performance of act 202 is shown in FIG. 3 and discussed below. In act 203, the facility receives user input painting content classifications onto portions of the displayed document. In some embodiments, the facility only accepts this painting user input from, and/or only displays the visual controls used to generate this painting user input to, a user who is authorized to impose content classifications upon portions of the document, such as a user who is an author of the document. An example of the facility's performance of act 203 is shown in FIG. 4 and discussed below. In act 204, the facility stores the content classifications painted onto document portions for those document portions. In act 205, the facility augments the display of the document to reflect the painted content classifications. An example of the facility's performance of acts 204 and 205 is shown in FIG. 5 and discussed below. After act 205, this process concludes.

Those skilled in the art will appreciate that the acts shown in FIG. 2 and in each of the flow diagrams discussed below may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

FIG. 3 is a display diagram showing a sample display presented by the facility in some embodiments to present a document for content classification painting. The display 300 includes a document window 301 containing a visual representation of the document, including paragraphs 350, 360, 370, 380, and 390. In this case, the document is a business plan for a business enterprise for finding and exploring submerged shipwrecks that might contain treasure. The display further includes a content classification painting palette 310, which includes regions 311-313, each palette region corresponding to a different content classification level. The user can click on, touch, or otherwise interact with one of these regions in order to select the corresponding content classification level for painting.

FIG. 4 is a display diagram showing a sample display presented by the facility in some embodiments when the user uses the content classification palette to paint content classifications onto portions of a displayed document. It can be seen in display 400 that the user has painted paragraph 470 with a "private" content classification level, indicating that people outside of the company should not be able to view this portion of the document; and has painted paragraph 480 with a "confidential" content classification level, so that only individually-identified employees of the company can view this portion of the document. The user has done so by interacting with the private region 412 of the palette—such as by touching it—then interacting with paragraph 470—such as by drawing a circle around it. The user then repeats this process by interacting with confidential region 411 of the palette, then selecting paragraph 480. In other embodiments, the user may first interact with a paragraph—such as by selecting paragraph 480—and then interact with a region of the palette—such as confidential region 411. As noted above, the selection of portions to which to apply content classifications can be at virtually any level of granularity, including a character-by-character level. As also noted above, in various embodiments, the facility displays a variety of kinds of visual indications of the content classification levels imposed on portions of the document. In some embodiments, the user can perform a similar process in order to change the classification level of all or part of an already-classified portion of the document.

FIG. 5 is a table diagram showing sample contents of a content classification table used by the facility in some embodiments to store content classifications that have been imposed on document portions. The content classification table 500 is made up of rows, such as rows 501-502, each corresponding to a different document portion upon which a content classification has been imposed. Each of the rows is divided into the following columns: a document ID column 511 containing an identifier identifying the document in which the portion resides; a portion column 512 identifying a portion of the document to which the classification applies; and a classification level column 513 identifying the classification level imposed upon the document portion to which the row corresponds. It can be seen that row 501 stores the result of imposing private content classification 471 on paragraph 470 of the sample document based upon the user interactions described above in connection with FIG. 4. Similarly, row 502 reflects the imposition of confidential classification 481 on paragraph 480 of the document in response to the user interactions discussed above in connection with FIG. 4. In various embodiments, the facility uses a variety of schemes to formulate the portion references in column 512, including using paragraph numbers as shown; using character number or other positional ranges; using lists of pointers or identifiers for included document elements, etc. In some embodiments, where the document is stored as a collection of individually-addressable fragments, the facility: (1) ensures that the portion is stored as one or more fragments, splitting existing fragments as needed such that the portion is contained in one or more fragments that do not contain content of the document that is outside the portion; and (2) stores in the content classification table one or more fragment identifiers adequate to identify and retrieve these fragments without the need for any separate document identifier.

While FIG. 5 and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed and/or encrypted; may contain a much larger number of rows than shown, etc.

After the facility has been used to paint content classifications onto portions of a document, those content classifications can be used to control access to those portions of the content by different users, such as by controlling whether different users can view these portions of the document. As noted above, in various embodiments, the facility has various levels of involvement in this control process.

Figure 6:
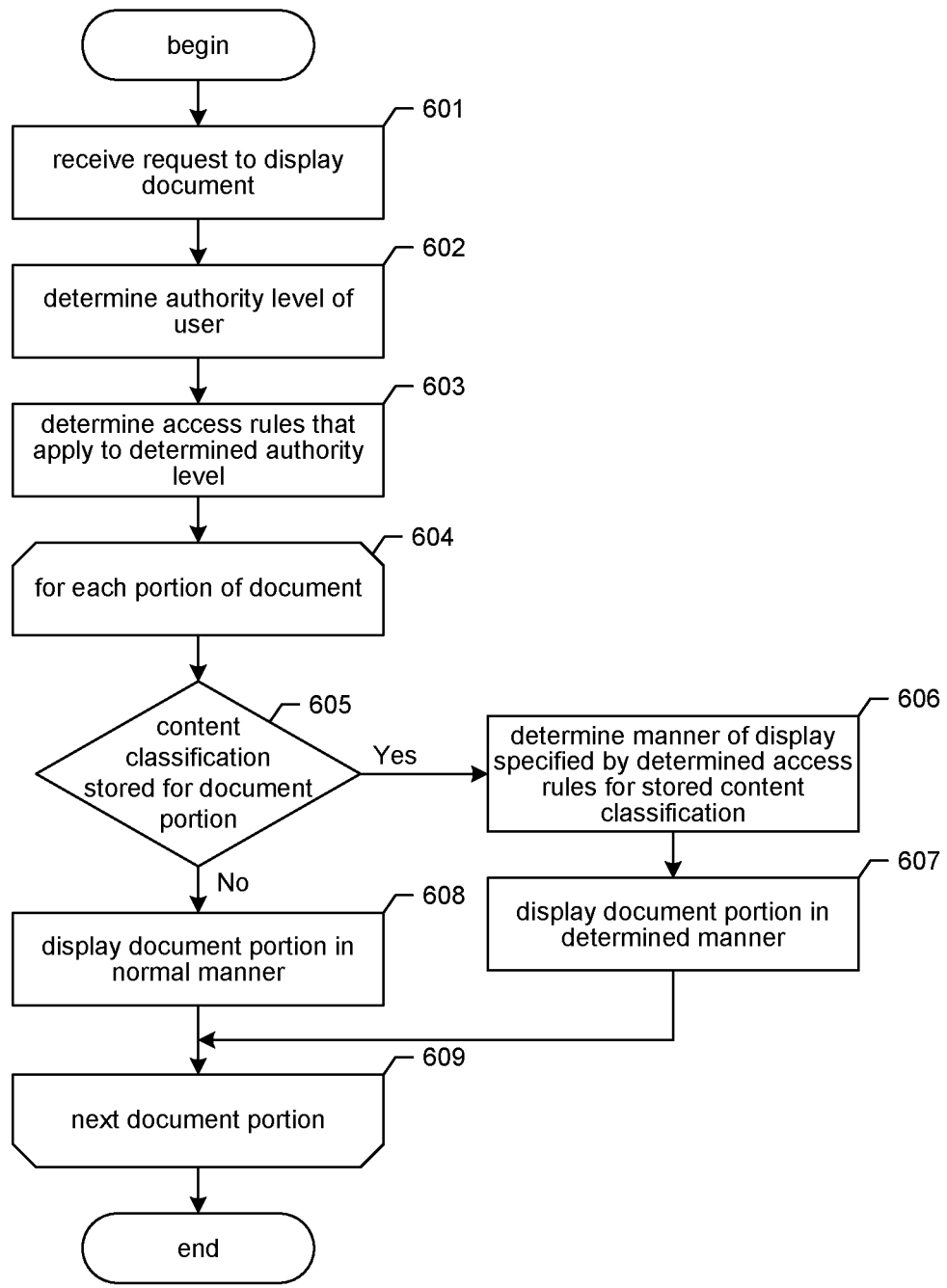
FIG. 6 is a flow diagram showing a process performed by the facility in some embodiments to control access to document portions based upon their content classifications.

FIG. 6 is a flow diagram showing a process performed by the facility in some embodiments to control access to document portions based upon their content classifications. In act 601, the facility receives a request from a particular user to display a document. In act 602, the facility determines an authority level of the user based upon their identity. In act 603, the facility determines, based upon an access policy, such an access policy of an organization, access rules that apply to users having the authority level determined in act 602. In acts 604-609, the facility loops through each portion of the document. In act 605, if a content classification is stored for the document portion, such as in the content classification table, then the facility continues in act 606, else the facility continues in act 608. In act 606, the facility determines the manner of display specified by the access rules determined in act 603 for the content classification level that is stored for the current document portion. For example, the access rules may specify that a user of the authority level determined in act 603 is not permitted to view the document portions having the content classification level stored for the current document portion, and therefore the content of the portion should (a) be displayed as blank space, (b) not be displayed and not occupy any space, (c) be displayed as a grey panel containing no visual information, etc. In act 607, the facility displays the current document portion in the manner determined in act 606. After act 607, the facility continues in act 609. In act 608, where no content classification is stored for the current document portion, the facility displays the current document portion in the normal manner. In act 609, if additional portions of the document remain to be processed, then the facility continues in act 604 to process the next document portion, else this process concludes.

Figure 7:
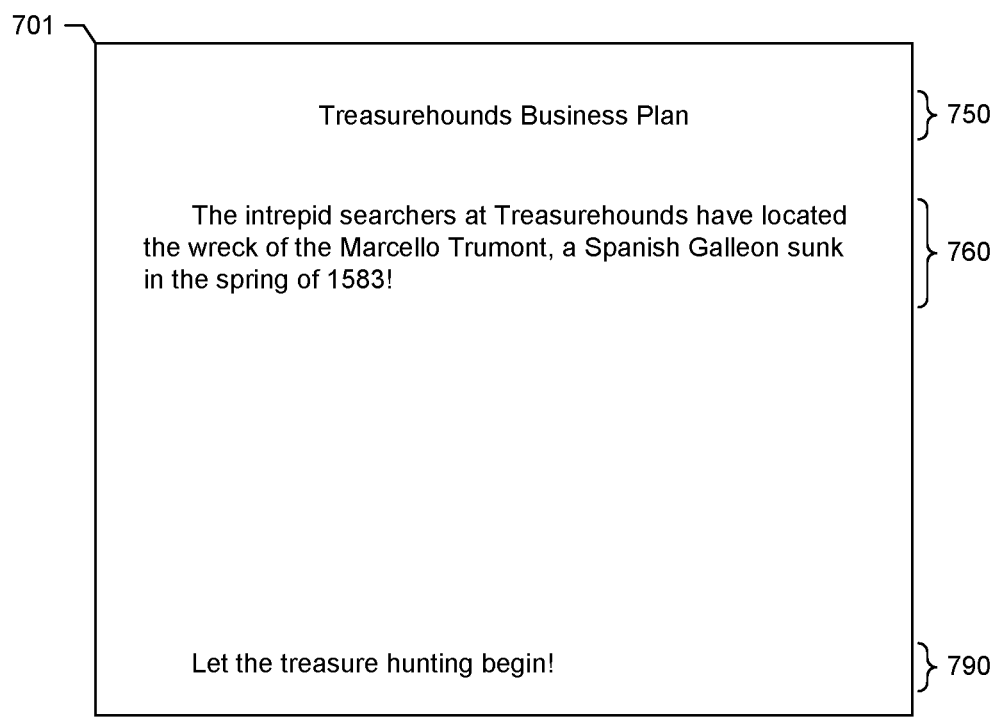
FIG. 7 is a display diagram showing a sample display presented by the facility in some embodiments to display a document portions of which are subject to content classifications to a first user in a first mode.

FIG. 7 is a display diagram showing a sample display presented by the facility in some embodiments to display a document, portions of which are subject to content classifications, to a first user in a first mode. The first user is not an employee of the Treasurehounds company, and can therefore view neither private nor confidential content. Accordingly, the document representation 701 presented to the first user is one that includes paragraphs 750, 760, and 790, none of which is the subject of private or confidential classification. Omitted are paragraph 470 shown in FIG. 4, which is subject to private content classification, and paragraph 480 shown in FIG. 4 which is subject to confidential content classification. As shown in this first mode, displayed paragraph 790 is positioned in the same location relative to displayed paragraph 760, implicitly conveying the omission of content between paragraphs 760 and 790. In some embodiments (not shown), the facility explicitly indicates this omission, such as by displaying a gray box in this space, displaying two gray boxes each corresponding to the dimensions of omitted paragraphs 470 and 480, etc.

Figure 8:
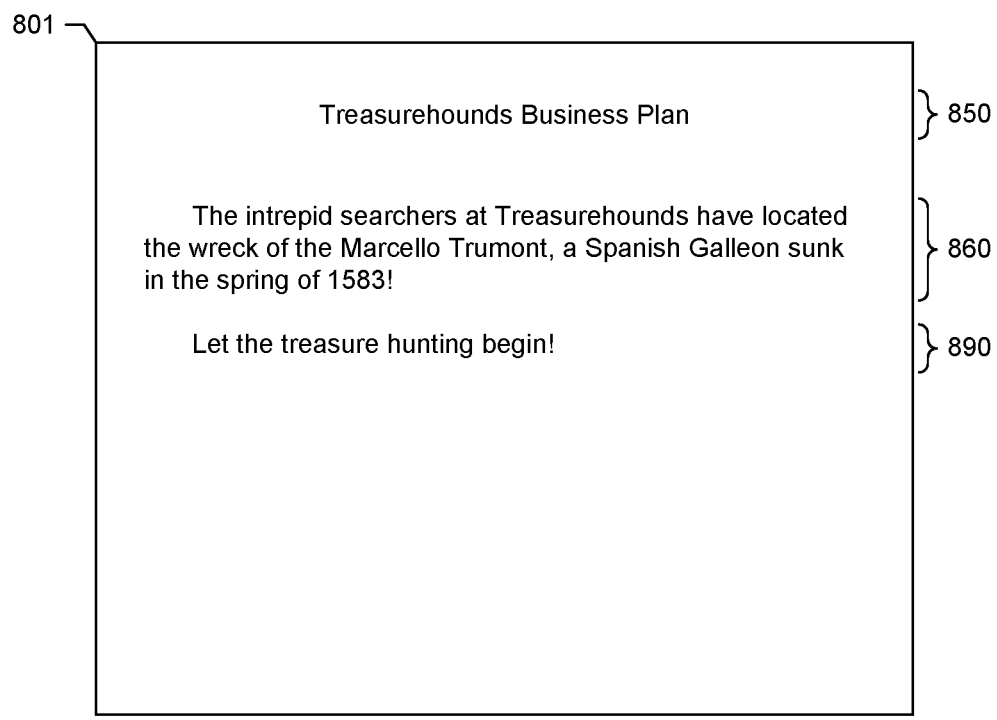
FIG. 8 is a display diagram showing a sample display presented by the facility in some embodiments to display a document portions of which are subject to content classifications to the first user in a second mode.

FIG. 8 is a display diagram showing a sample display presented by the facility in some embodiments to display a document, portions of which are subject to content classifications, to the first user in a second mode. In the second mode shown in FIG. 8, the facility provides no explicit or implicit indication that content has been omitted from between paragraphs 860 and 690 in the displayed document representation, moving displayed paragraph 890 to be immediately below displayed paragraph 860.

Figure 9:
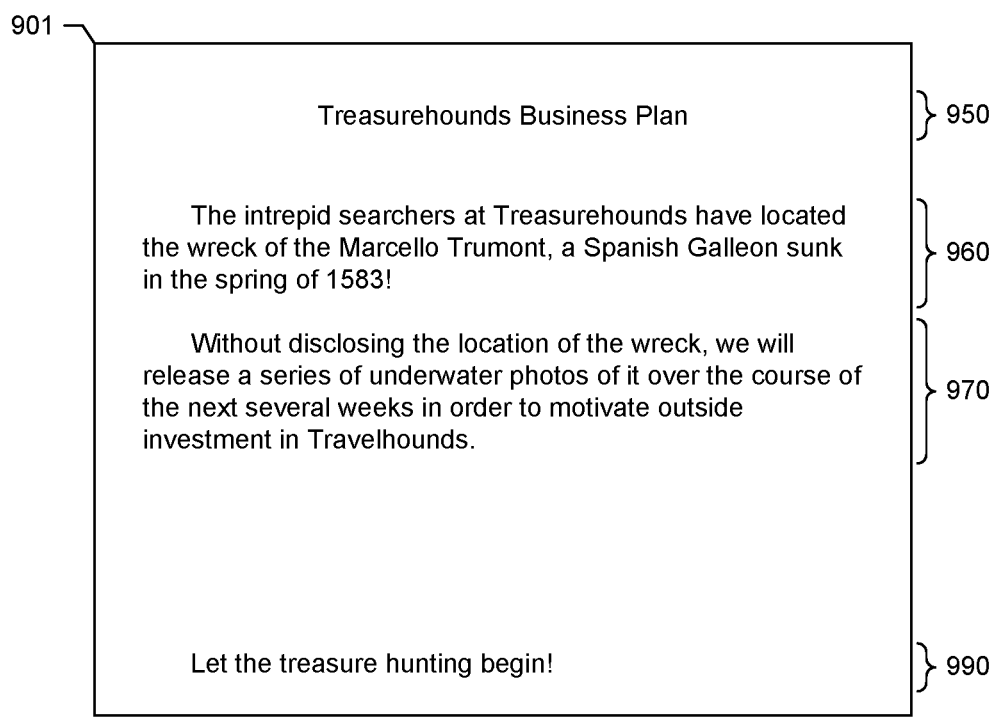
FIG. 9 is a display diagram showing a sample display presented by the facility in some embodiments to display a document portions of which are subject to content classifications to a second user in the first mode.

FIG. 9 is a display diagram showing a sample display presented by the facility in some embodiments to display a document, portions of which are subject to content classifications, to a second user in the first mode. The second user is an employee of Treasurehounds company, and is accordingly authorized to view private information, but is not individually authorized to view confidential information. Accordingly, the document representation 901 displayed to the second user includes paragraph 970, which is subject to private content classification, but does not include paragraph 480 shown in FIG. 4, which is subject to confidential content classification.

Figure 10:
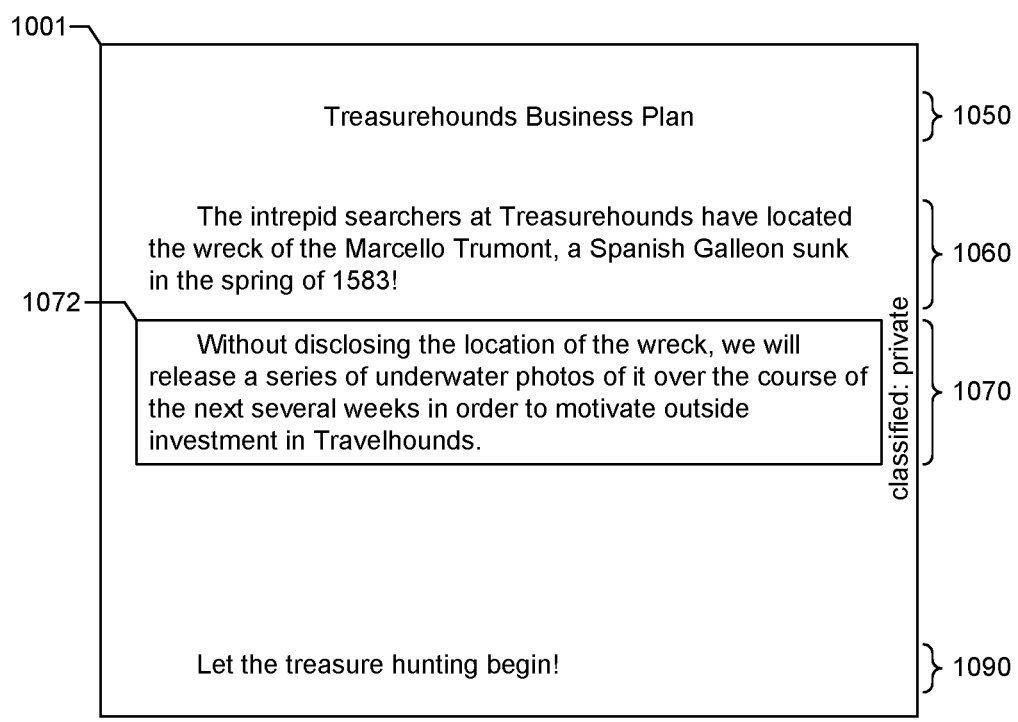
FIG. 10 is a display diagram showing a sample display presented by the facility in some embodiments to display a document portions of which are subject to content classifications to the second user in a third mode.

FIG. 10 is a display diagram showing a sample display presented by the facility in some embodiments to display a document, portions of which are subject to content classifications, to the second user in a third mode. In the third mode, the facility displays an explicit visual indication of content that is displayed to the current user, but is classified in a way that prevents its display to some other users. It can be seen that the facility has added visual indication 1072 to paragraph 1070, indicating that it is subject to private content classification. As shown here, there is no similar visual indication for paragraph 480 shown in FIG. 4, as the second user is not authorized to view this portion of the document, being subject to confidential content classification.

Like the visual indications shown to the painting user, in various embodiments, the facility adds visual indications of content classifications for the viewing user(s) in various positions, including, for example, in the document representation's margin; in a scrollbar for scrolling the document representation; in a pop-up window triggered by user interactions such as hovering a mouse cursor or directing a human gaze; within the content of the document representation; etc. In various embodiments, these indications take various forms, including, for example, painting segments of the height of the scrollbar with different colors or patterns relating to content classifications imposed on document portions at corresponding positions within the representation; directly painting the content of the document representation with different colors or patterns, either changing the color of the content (e.g., text) itself, or changing the color or pattern of the background against which the content is displayed, or inserting a border of a particular color and/or pattern around the content; adding to the margin shapes whose presence, colors, patterns, dimensions, or areas relate to the content beside them; etc.

In some embodiments, the facility provides a computing system for interacting with an electronic document, comprising: a processor; and a memory having contents that, when executed by the processor: cause to be displayed a visual representation of the document; receive first input representing a painting interaction with a portion of the displayed visual representation of the document that corresponds to a portion of the document; and in response to receiving the first input, impose on the corresponding portion of the document a distinguished content sensitivity classification level.

In some embodiments, the facility provides one or more memories collectively containing a content classification data structure, the content classification data structure comprising a plurality of elements, each element comprising: information identifying a portion of a document; and information indicating a content classification level specified for the identified portion of a document via a painting user interface interaction, such that the contents of a particular element can be used to perform content classification-based access control with respect to the portion of a document that it identifies.

In some embodiments, the facility provides one or more memories collectively having contents configured to cause a computing system to: cause to be displayed to an owner of the document a first visual representation of the document; receive input representing a painting interaction with a portion of the displayed first visual representation of the document that corresponds to a portion of the document; and in response to receiving the first input, impose on the corresponding portion of the document a distinguished content classification level.

In some embodiments, the facility provides a method in a computing system, comprising: causing to be displayed to an owner of the document a first visual representation of the document; receiving input representing a painting interaction with a portion of the displayed first visual representation of the document that corresponds to a portion of the document; and in response to receiving the first input, imposing on the corresponding portion of the document a distinguished content classification level.

It will be appreciated by those skilled in the art that the above-described facility may be straightforwardly adapted or extended in various ways. While the foregoing description makes reference to particular embodiments, the scope of the invention is defined solely by the claims that follow and the elements recited therein.

We claim:

1. A computing system for interacting with an electronic document, comprising:
    a processor; and
    a memory having contents that, when executed by the processor:
        cause to be displayed a visual representation of the electronic document;
        receive first input from a first user representing a selection of a portion of the displayed visual representation of the electronic document that corresponds to a first portion of the electronic document;
        impose on the corresponding first portion of the electronic document a first distinguished content sensitivity classification level, store the first distinguished content sensitivity classification level for the corresponding first portion of the electronic document, and cause to be displayed within the displayed visual representation of the electronic document a first visual indication of the first distinguished content sensitivity classification level, the displayed first visual indication identifying the first portion of the displayed visual representation of the electronic document with which the selection represented by the received first input was performed;
        receive second input from the first user representing a selection of a portion of the displayed visual representation of the electronic document that corresponds to a second portion of the electronic document;
        impose on the corresponding second portion of the electronic document a second distinguished content sensitivity classification level distinct from the first distinguished content sensitivity classification level, store the second distinguished content sensitivity classification level for the corresponding second portion of the electronic document, and cause to be displayed within the displayed visual representation of the electronic document a second visual indication of the first distinguished content sensitivity classification level distinct from the first visual indication, the displayed second visual indication identifying the second portion of the displayed visual representation of the electronic document with which the selection represented by the received second input was performed;
        receive a request from a second user to display the electronic document;
        determine an authority level of the second user;
        determine access rules for the authority level of the second user based upon an access policy; and
        for each of a plurality of portions of the electronic document,
            determine whether a content sensitivity classification level is stored for the portion of the electronic document,
            in response to a content sensitivity classification level not being stored for the portion of the electronic document, display the portion to the second user, and
            in response to a content sensitivity classification level being stored for the portion of the electronic document, determine a manner of display for the portion based on the content sensitivity classification stored for the portion of the electronic document and the authority level of the second user and display the portion to the second user in the determined manner of display.

2. The computing system of claim 1 wherein the memory further has contents that, when executed by the processor:
    receive third input selecting the first distinguished content sensitivity classification level from among a plurality of available content sensitivity classification levels.

3. The computing system of claim 2 wherein the memory further has contents that, when executed by the processor:
    cause to be displayed concurrently with the visual representation of the electronic document a palette, the palette comprising a plurality of regions, each region corresponding to a different content sensitivity classification level among the plurality of available content sensitivity classification levels, and wherein the third input represents an interaction with respect to a point within a region of the palette that corresponds to the first distinguished content sensitivity classification level.

4. The computing system of claim 1 wherein the memory further has contents that, when executed by the processor:
    before the imposing, determine that the first input was received from a user authorized to impose the plurality of available content sensitivity classification levels on portions of the electronic document.

5. The computing system of claim 1 wherein the plurality of available sensitivity classification levels is a subset of a multiplicity of existing content sensitivity classification levels, and the first user is not authorized to impose at least one content sensitivity classification level that is in the multiplicity of existing content sensitivity classification levels and is not in the plurality of available content sensitivity classification levels.

6. The computing system of claim 1 wherein the selection represented by the received first input is with respect to a portion of the visual representation of the electronic document that corresponds to one or more paragraphs of the electronic document.

7. The computing system of claim 1 wherein the selection represented by the received first input is with respect to a portion of the visual representation of the electronic document that corresponds to a contiguous group of a plurality of document elements that comprise the electronic document.

8. The computing system of claim 1 wherein the selection represented by the received first input is with respect to a user-specified span of characters in the visual representation of the electronic document.

9. The computing system of claim 1 wherein the first and second visual attributes are different colors.

10. A method for controlling access to content of an electronic document, the method comprising:
    displaying, with a processor, a visual representation of the electronic document;
    receiving, with the processor, first input representing a selection of a portion of the displayed visual representation of the electronic document that corresponds to a first portion of the electronic document;
    imposing, with the processor, on the first portion of the electronic document a first distinguished content sensitivity classification level, storing the first distinguished content sensitivity classification level for the first portion of the electronic document, and causing to be displayed within the displayed visual representation of the electronic document a first visual indication of the first distinguished content sensitivity classification level, the displayed first visual indication identifying the first portion of the displayed visual representation of the electronic document with which the selection represented by the received first input was performed;

receiving, with the processor, second input from the first user representing a selection of a portion of the displayed visual representation of the electronic document that corresponds to a second portion of the electronic document;

imposing, with the processor, on the second portion of the electronic document a second distinguished content sensitivity classification level distinct from the first distinguished content sensitivity classification level, storing the second distinguished content sensitivity classification level for the second portion of the electronic document, and causing to be displayed within the displayed visual representation of the electronic document a second visual indication of the first distinguished content sensitivity classification level distinct from the first visual indication, the displayed second visual indication identifying the second portion of the displayed visual representation of the electronic document with which the selection represented by the received second input was performed;

receiving a request from a second user to display the electronic document;

determining an authority level of the second user;

determining access rules for the authority level of the second user based upon an access policy; and for each of a plurality of portions of the electronic document,
determining whether a content sensitivity classification level is stored for the portion of the electronic document,
in response to a content sensitivity classification level not being stored for the portion of the electronic document, displaying the portion to the second user, and
in response to a content sensitivity classification level being stored for the portion of the electronic document, determining a manner of display for the portion based on the content sensitivity classification stored for the portion of the electronic document and the authority level of the second user and displaying the portion to the second user in the determined manner of display.

11. The method of claim 10, further comprising, prior to receiving the first input, receiving third input selecting the first distinguished content sensitivity classification level from among a plurality of available content sensitivity classification levels.

12. The method of claim 11, further comprising displaying concurrently with the visual representation of the electronic document a palette, the palette comprising a plurality of regions, each region corresponding to a different content sensitivity classification level among the plurality of available content sensitivity classification levels, and wherein the third input represents an interaction with respect to a point within a region of the palette that corresponds to the first distinguished content sensitivity classification level.

13. The method of claim 10, further comprising, before the imposing, determining that the first input was received from a user authorized to impose the first distinguished content sensitivity classification level on the first portion of the electronic document.

14. A non-transitory computer-readable medium storing instructions that, when executed by a processor, perform a set of functions, the set of functions comprising:
displaying a visual representation of an electronic the document;

receiving first input from a first user representing a selection of a portion of the displayed visual representation of the electronic document that corresponds to a first portion of the electronic document;

imposing on the first portion of the electronic document a first distinguished content sensitivity classification level, storing the first distinguished content sensitivity classification level for the first portion of the electronic document, and causing to be displayed within the displayed visual representation of the electronic document a first visual indication of the first distinguished content sensitivity classification level, the displayed first visual indication identifying the first portion of the displayed visual representation of the electronic document with which the selection represented by the received first input was performed;

receiving second input from the first user representing a selection of a portion of the displayed visual representation of the electronic document that corresponds to a second portion of the electronic document;

imposing on the second portion of the electronic document a second distinguished content sensitivity classification level distinct from the first distinguished content sensitivity classification level, storing the second distinguished content sensitivity classification level for the second portion of the electronic document, and causing to be displayed within the displayed visual representation of the electronic document a second visual indication of the first distinguished content sensitivity classification level distinct from the first visual indication, the displayed second visual indication identifying the second portion of the displayed visual representation of the electronic document with which the selection represented by the received second input was performed;

receiving a request from a second user to display the electronic document;

determining an authority level of the second user;

determining access rules for the authority level of the second user based upon an access policy; and for each of a plurality of portions of the electronic document,
determining whether a content sensitivity classification level is stored for the portion of the electronic document,
in response to a content sensitivity classification level not being stored for the portion of the electronic document, displaying the portion to the second user,
in response to a content sensitivity classification level being stored for the portion of the electronic document, determining a manner of display for the portion based on the content sensitivity classification stored for the portion of the electronic document and the authority level of the second user and displaying the portion to the second user in the determined manner of display.

15. The non-transitory computer-readable medium of claim 14, wherein the set of functions further includes receiving, prior to receiving the first input, third input selecting the first distinguished content sensitivity classification level from among a plurality of available content sensitivity classification levels.

16. The non-transitory computer-readable medium of claim 15, wherein the set of functions further includes displaying concurrently with the visual representation of the electronic document a palette, the palette comprising a plurality of regions, each region corresponding to a different content sensitivity classification level among the plurality of available content sensitivity classification levels, and wherein the third input represents an interaction with respect to a point within a region of the palette that corresponds to the first distinguished content sensitivity classification level.

* * * * *